United States Patent

Jäger

[11] 4,126,609
[45] Nov. 21, 1978

[54] AZO DYESTUFF WITH A FIBER-REACTIVE GROUP ATTACHED TO A NAPHTHALENE SULPHONIC ACID COMPONENT

[75] Inventor: Horst Jäger, Leverkusen, Germany

[73] Assignee: Bayer Aktiengesellschaft, Leverkusen, Germany

[21] Appl. No.: 376,184

[22] Filed: Jul. 3, 1973

[30] Foreign Application Priority Data

Jul. 3, 1972 [DE] Fed. Rep. of Germany ....... 2232541

[51] Int. Cl.$^2$ .................. C09B 62/08; C09B 62/24; C09B 62/40; D06P 1/382
[52] U.S. Cl. .................. 260/153; 260/154; 260/156; 260/158; 260/160; 260/162; 260/163; 260/510
[58] Field of Search .......... 260/146 R, 146 D, 146 T, 260/153, 154, 160, 162, 163, 156, 158

[56] References Cited

U.S. PATENT DOCUMENTS

| | | | |
|---|---|---|---|
| 2,951,072 | 8/1960 | Tilley et al. | 260/153 |
| 2,951,837 | 9/1960 | Andrew et al. | 260/153 |
| 3,133,909 | 5/1964 | Riat | 260/146 T |
| 3,158,597 | 11/1964 | Blass et al. | 260/199 |
| 3,169,124 | 2/1965 | Escher et al. | 260/163 |
| 3,213,078 | 10/1965 | Benz et al. | 260/146 D |
| 3,277,075 | 10/1966 | Mayhew et al. | 260/201 |
| 3,449,317 | 6/1969 | De Montmollin | 260/161 |
| 3,462,410 | 8/1969 | Schneider | 260/153 |
| 3,492,285 | 1/1970 | Machatzke | 260/151 |

FOREIGN PATENT DOCUMENTS 977,814 12/1964 United Kingdom .................. 260/153

Primary Examiner—Floyd D. Higel
Attorney, Agent, or Firm—Plumley and Tyner

[57] ABSTRACT

Azo reactive dyestuffs which in the acid form correspond to the formula

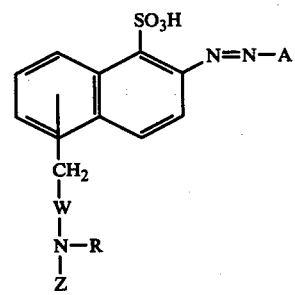

wherein R denotes hydrogen or lower alkyl, W denotes a direct bond or a bridge member, Z denotes a reactive group and A denotes the radical of a coupling component, and their use for the dyeing and printing of materials containing hydroxyl groups or amide groups as well as for the wash-fast dyeing and printing of natural or regenerated cellulose.

6 Claims, No Drawings

AZO DYESTUFF WITH A FIBER-REACTIVE GROUP ATTACHED TO A NAPHTHALENE SULPHONIC ACID COMPONENT

The present invention relates to new azo reactive dyestuffs which in the form of the acid correspond to the formula

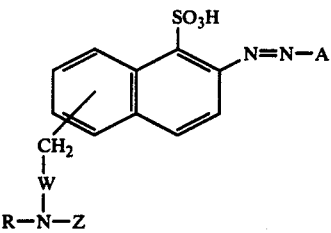
(I)

wherein
R denotes hydrogen or lower alkyl,
Z denotes a reactive group,
W denotes a direct bond or a bridge member and
A denotes the radical of a coupling component, especially those of the formula

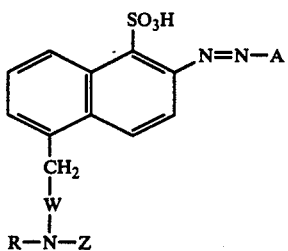
(II)

wherein
R, Z, W and A have the indicated meaning
as well as to the manufacture and use of these dyestuffs for dyeing and printing textile materials containing nitrogen or containing hydroxyl groups.

The invention further relates to amines which in the form of the acid correspond to the formula

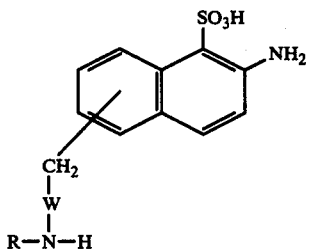
(III)

wherein
R and W have the indicated meaning, especially those of the formula

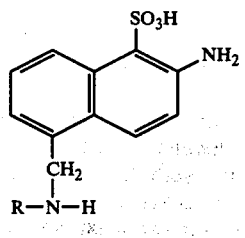
(IV)

wherein
R has the indicated meaning.

Examples of suitable lower alkyl substituents R are $CH_3$, $C_2H_5$ and $C_4H_9$.

W preferably represents a direct bond or a bridge member such as

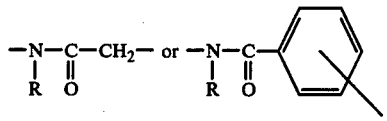

wherein
R denotes hydrogen or lower alkyl.

Examples of suitable radicals A are those of coupling components of the hydroxybenzene, aminobenzene, amino-naphthalene, hydroxynaphthalene, amino-hydroxynaphthalene, pyrazolone, aminopyrazole and acetoacetic acid arylamide series.

The radicals A can contain substituents which are customary for azo dyestuffs, for example sulphonic acid, carboxylic acid, optionally substituted sulphonamide, sulphone, alkylamino, aralkylamino, arylamino, acylamino, nitro, nitrile, hydroxyl, amino, alkoxy or azo groups, halogen atoms such as fluorine, chlorine and bromine, and the like.

By reactive groups Z there are understood groups which possess one or more reactive groups or removable substituents which, on application of the dyestuffs to cellulose materials in the presence of acid-binding agents, and optionally under the action of heat, can react with the hydroxyl groups of cellulose or, on application to high molecular polyamide fibres, such as wool, can react with the NH groups of these fibres, to form covalent bonds. Large numbers of such fibre-reactive groupings are known from the literature.

Reactive groups which are suitable according to the invention and which contain at least one removable substituent bound to a heterocyclic radical or to an aliphatic radical are, amongst others, those which contain at least one reactive substituent bound to a 5-membered or 6-membered heterocyclic ring, such as to a monazine, diazine or triazine ring, for example pyridine, pyrimidine, pyridazine, pyrazine, thiazine or oxazine ring or asymmetrical or symmetrical triazine ring, or to a ring system of this nature which possesses one or more fused aromatic rings, such as a quinoline, phthalazine, cinnoline, quinazoline, quinoxaline, acridine, phenazine and phenanthridine ring system; the 5-membered or 6-membered heterocyclic rings which possess at least one reactive substituent are accordingly preferably those which contain one or more nitrogen atoms and can contain fused 5-membered or preferably 6-membered carbocyclic rings. Amongst the reactive substituents on the heterocyclic structure there are to be mentioned, for example, halogen (Cl, Br or F), ammonium, including hydrazinium, sulphonium, sulphonyl, azido- ($N_3$), thiocyanato, thio, thioether, hydroxyether, sulphinic acid and sulphonic acid. In detail, examples to be mentioned are mono- or di-halogeno-symmetrical triazinyl radicals, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxy- or sulphophenyl)amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methyl- or methoxyphenyl)-oxy-4-chlorotriazinyl-6, 2-alkylmercapto- or 2-arylmercapto- or 2-(substituted aryl)mercapto-4-chlorotriazinyl-6, such as 2-β-hydroxyethylmercapto-4-chlorotriazinyl-6, 2-phenylmercapto-4-chlorotriazinyl-6, 2-(4'-methylphenyl)-mercapto-4-chlorotriazinyl-6, 2-(2',4'-dinitro)-phenylmercapto-4-chlorotriazinyl-6, 2-methyl-4-chlorotriazinyl-6, 2-phenyl-4-chlorotriazinyl-6, mono-, di- or trihalogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy or -5-cyano- or -5-vinyl- or -5-sulpho- or -5-mono-, -di- or -trichloromethyl- or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl- or 6-carbonyl, 2,4-dichloroquinazoline-7- or -6-sulphonyl or -carbonyl, 2- or 3- or 4-(4',5'-dichloropyridazon-6'-yl-1')phenylsulphonyl- or -carbonyl, β-(4',5'-dichloropyridazon-6'-yl-1')-ethylcarbonyl, N-methyl-N-(2,4-dichlorotriazinyl-6-)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)aminoacetyl, N-methyl-N-(2,3-dichloroquinoxaline-6-carbonyl)aminoacetyl, as well as the corresponding bromine and fluorine derivatives of the abovementioned chlorine-substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-cyano-4-pyrimidinyl, 2-fluoro-5-methyl-4-pyrimidinyl, 2-fluoro-5-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-tribomomethyl-4-pyrimidinyl; triazine radicals containing sulphonyl groups, such as 2,4-bis-(phenylsulphonyl)-triazinyl-6, 2-(3'-caroxyphenyl)-sulphonyl-4-chlorotriazinyl-6, 2-(3'-sulphophenyl)-sulphonyl-4-chlorotriazinyl-6 and 2,4-bis-(3'-carboxy-phenylsulphonyl)-triazinyl-6; pyrimidine rings containing sulphonyl groups, such as 2-carboxymethylsulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethyl-pyrimidinyl-4, 2-methylsulphonyl-4-chloro-6-methyl-pyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methyl-pyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxypyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methylpyrimidine-5-sulphonyl- or -carbonyl; triazine rings containing ammonium groups, such as 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-aminotriazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)aminotriazinyl-6, and also 4-phenylamino- or 4-(sulphophenylamino)-triazinyl-6 radicals, which contain 1,4-bis-azabicyclo-[2,2,2]-octane or 1,2-bis-azabicyclo-[0,3,3]-octane bonded as a quaternary structure via a nitrogen bond in the 2-position, 2-pyridinium-4-phenylamino- or -4-(o-, m- or p-sulphophenyl)-amino-triazinyl-6 as well as corresponding 2-oniumtriazinyl-6 radicals, which are substituted in the 4-position by alkylamino, such as methylamino, ethylamino or β-hydroxyethylamino, or alkoxy, such as methoxy or alkoxy, or aroxy, such as phenoxy or sulphophenoxy groups; 2-chlorobenzthiazole-5- or -6-carbonyl or -5- or -6-sulphonyl, 2-arylsulphonyl- or -alkyl-sulphonylbenzthiazole-5- or -6-carbonyl or -5- or -6-sulphonyl, such as 2-methylsulphonyl- or 2-ethylsulphonyl-benzthiazole-5- or -6-sulphonyl or -carbonyl, 2-phenylsulphonyl-benzthiazole-5- or -6-sulphonyl or -carbonyl and the corresponding 2-sulphonylbenzthiazole-5- or -6-carbonyl or -sulphonyl derivatives which contain sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl and the N-oxide of 4-chloro- or 4-nitro-quinoline-5-carbonyl.

Further, there are to be mentioned reactive groups of the aliphatic series, such as acryloyl, mono-, di- or tri-chloroacryloyl, such as —CO—CH=CH—Cl, —CO—CCl=CH$_2$, —CO—CCl=CH—CH$_3$ and also —CO—CCl=CH—COOH, —CO—CH=C-Cl—COOH, β-chloropropionyl, 3-phenylsulphonyl-propionyl, 3-methylsulphonylpropionyl, β-sulphatoethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1- or -sulphonyl-1, β-(2,2,3,3-tetrafluorocyclobutyl-1)-acryloyl, α- or β-bromoacryloyl, and α- or β-alkyl- or -arylsulphonyl-acryloyl groups, such as α- or β-methylsulphonylacryloyl.

Preferred compounds within the scope of the new dyestuffs correspond to the following formulae:

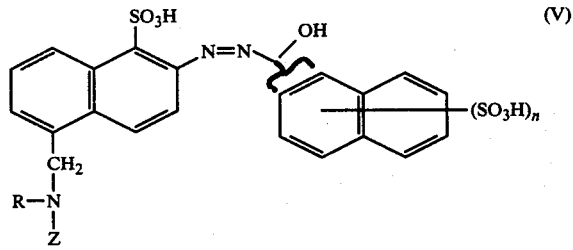

(V)

wherein
R and Z have the indicated meaning and
n represents 1, 2 or 3;

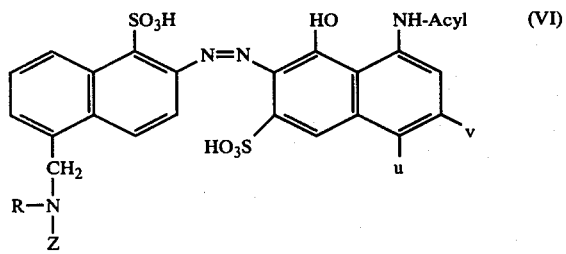

(VI)

wherein
R and Z have the indicated meaning,
u and v represent hydrogen or a sulphonic acid group and
Acyl represents and acyl group, for example an alkylcarbonyl, alkylsulphonyl, arylcarbonyl or arylsulphonyl group.

Preferred alkyl groups are herein those with 1-4 C. atoms and preferred aryl groups are optionally substituted phenyl groups, for example phenyl groups optionally substituted by Cl, $C_1$-$C_4$-alkyl or $C_1$-$C_4$-alkoxy.

Further preferred dyestuffs are those of the formula

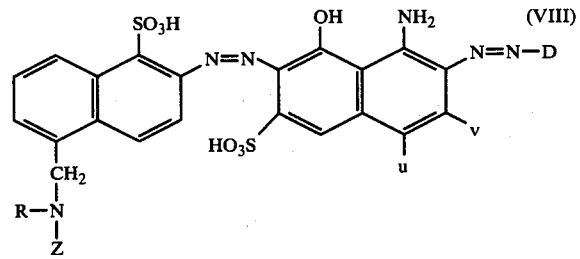

(VIII)

wherein
R, Z, u and v have the abovementioned meaning and
D represents the radical of a diazo component of the benzene or naphthalene series, and those of the formula

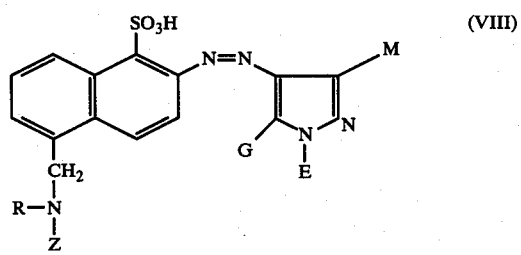

(VIII)

wherein
R and Z have the abovementioned meaning,
E represents an alkyl, phenyl or naphthyl radical which is substituted by at least one group which confers solubility in water, especially a sulphonic acid group,
M represents a methyl, carboxyl or carbonamide group and
G represents an OH or NH$_2$ group.

The dyestuffs according to the invention can be manufactured by a method wherein, in dyestuffs of the general formula

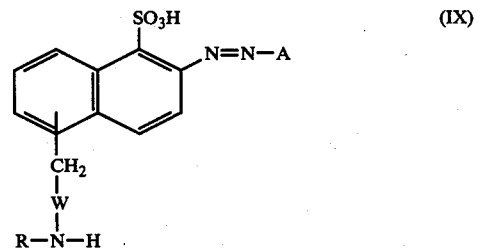

(IX)

especially those of the formula

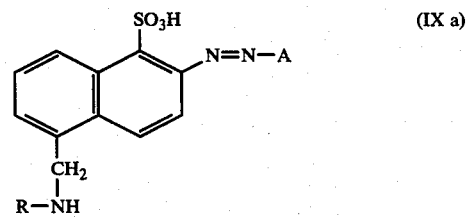

(IX a)

wherein

R, W and A have the abovementioned meaning the grouping

is converted into a grouping

by condensation with a reactive component of the general formula $$X-Z \qquad (X)$$

wherein
Z has the indicated meaning and
X represents a substituent which can be split off.

Reactive components of the formula (X) suitable for this purpose are, for example, those on which the above-mentioned reactive groups Z are based, that is to say in general the halides, especially the chlorides, of the acyl components Z which have been mentioned. Amongst the large number of available compounds there may here be mentioned, by way of a selection: Trihalogeno-symmetrical triazines, such as cyanuric chloride and cyanuric bromide, dihalogeno-monoamino- and monosubstituted amino-symmetrical triazines, such as 2,6-dichloro-4-amino-triazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2′, 3′-, -2′, 4′-, -3′, 4′- or -3′, 5′-disulphophenyl)-aminotriazine, dihalogenoalkoxy- and aryloxy-symmetrical triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine, dihalogeno-alkylmercapto- and -arylmercapto-symmetrical triazines, such as 2,6-dichloro-4-ethylmercapto-triazine, 2,6-dichloro-4-phenylmercaptotriazine and 2,6-dichloro-4-(p-methylphenyl)-mercaptotriazine; tetrahalogenopyrimidines, such as tetrachloro-, tetrabromo- or tetrafluoro-pyrimidine, 2,4,6-trihalogenopyrimidines, such as 2,4,6-trichloro-, tribromo- or -trifluoro-pyrimidine and dihalogenopyrimidines, such as 2,4-dichloro-, -dibromo- or -difluoropyrimidine; 2,4,6-trichloro-5-nitro- or -5-methyl- or -5-carbomethoxy-or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethyl-sulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoro-pyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethyl-pyrimidine, 2,4-difluoro-5-methylsulphonyl-pyrimidine, 2,4-difluoro-5-phenyl-pyrimidine, 2,4-difluoro-5-carbonamido-pyrimidine, 2,4-difluoro-5-carbomethoxy-pyrimidine, 2,4-difluoro-6-trifluoromethyl-pyrimidine, 2,4-difluoro-5-bromo-6-trifluoromethyl-pyrimidine, 2,4-difluoro-6-carbonamido-pyrimidine, 2,4-difluoro-6-carbomethoxy-pyrimidine, 2,4-difluoro-6-phenyl-pyrimidine, 2,4-difluoro-6-cyano-pyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; pyrimidine reactive components with removable sulphonyl groups, such as 2-carboxymethylsulphonyl-4-chorpyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trismethylsulphonylpyrimidine, 2,6-bis-methylsulphonyl-4,5-dichloropyrimidine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methyl-pyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-trismethylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2′- or 3′- or 4′-carboxyphenylsulphonyl)-4,5-dichloro-6-methylpyrimidine, 2,4-bis-(2′- or 3′- or 4′-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl- 4-chloro- or -4-bromopyrimidine-5-carboxylic acid chloride or bromide and 2,6-bis-(methylsulphonyl)-4-chloropyrimidine-5-carboxylic acid chloride; examples of further reactive components of the heterocyclic series which possess reactive sulphonyl substituents are 3,6-bis-phenylsulphonyl-pyridazine, 3-methylsulphonyl-6-chloropyridazine, 3,6-bis-trichloromethylsulphonylpyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonylquinazoline, 2,4-bis-trichloromethylsulphonylquinoline, 2,4-bis-carboxymethylsulphonylquinoline, 2,6-bis-(methylsulphonyl)-pyridine-4-carboxylic acid chloride and 1-(4'-chlorocarbonylphenyl- or 2'-chlorocarbonylethyl)-4,5-bis-methylsulphonyl-pyridazone(6); further heterocyclic reactive components with mobile halogen are, amongst others, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride as well as the corresponding bromine compounds, 2,4-dichloroquinazoline-6- or -7-carboxylic acid chloride or -7-sulphonic acid chloride as well as the corresponding bromine compounds, 2- or 3- or 4-(4',5'-dichloropyridazon-6'-yl-1')-phenylsulphonic acid chloride or -carboxylic acid chloride as well as the corresponding bromine compounds, β-(4',5'-dichloropyridazon-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylaminotriazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride as well as the corresponding 2-sulphonylbenzthiazole derivatives which contain sulphonic acid groups in the fused benzene ring, 3,5-bis-methylsulphonyl-isothiazole-4-carboxylic acid chloride, 2-chlorobenzoxazole-5- or -6-carboxylic acid chloride or -sulphonic acid chloride as well as the corresponding bromine derivatives, 2-chlorobenzimidazole-5- or -6-carboxylic acid chloride or -sulphonic acid chloride as well as the corresponding bromine derivatives, 2-chloro-1-methylbenzimidazole-5- or -6-carboxylic acid chloride or -sulphonic acid chloride as well as the corresponding bromine derivatives, 2-chloro-4-methylthiazole-(1,3)-5-carboxylic acid chloride or -4- or -5-sulphonic acid chloride, 2-chlorothiazole-4- or -5-sulphonic acid chloride and the corresponding bromine derivatives.

As examples from the series of the aliphatic reactive components there should be mentioned: Acrylic acid chloride, mono-, di- or tri-chloroacrylic acid chloride, 3-chloropropionic acid chloride, 3-phenylsulphonyl-propionic acid chloride, 3-methylsulphonyl-propionic acid chloride, 3-ethylsulphonylpropionic acid chloride, 3-chloroethanesulphochloride, chloromethanesulphochloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chlorocyclobutane-1)-carboxylic acid chloride, β-methylsulphonyl-acrylic acid chloride, α-methylsulphonylacrylic acid chloride and α-bromoacrylic acid chloride and β-bromoacrylic acid chloride.

If the conversion leads to dyestuffs which possess more than one reactive group in the radical Z or at another point of the dyestuff molecule, these groups can be partly replaced by other radicals, for example amino radicals, which can in turn possess reactive groups, for example in the form of esterified hydroxyalkyl groups. In principle, it is possible for two or more reactive groups which are different from one another to be present in the dyestuff.

These condensation reactions are in general carried out in an aqueous or organic medium and in a weakly alkaline, neutral or acid range.

The dyestuffs of the general formula (IX) which serve as the starting material for this process can be manufactured by coupling diazotised amines of the formula (III) and especially (IV) with azo components A—H (XI) in a medium which is acidified with a mineral acid or acetic acid, or is neutral, or is rendered alkaline with bicarbonate, sodium carbonate or sodium hydroxide.

Examples of suitable azo components (XI) are those from the series of the aminobenzenes, aminonaphthalenes, hydroxynaphthalenes, amino-hydroxy-naphthalenes, acylaminohydroxy-naphthalenes, arylamino-hydroxy-naphthalenes, pyrazolones, aminopyrazoles and acetoacetic acid amides. Amongst the large number of azo components to be mentioned here, the following may be mentioned as a selection: 1-Amino-2-sulpho-5-acetylamino-benzene, 2-amino-5,6- or 7-sulpho-naphthalene, 2-amino-5,7-disulpho-naphthalene, 2-amino-3,6-disulphonaphthalene, 1-amino-6- or 7-sulpho-naphthalene, 1-amino-3-acetylamino-benzene, 1-amino-3-ureido-benzene, 1-amino-3-methyl-benzene, 1-amino-3-methyl-6-methoxy-benzene, 1-amino-2,5-dimethoxy-benzene, 1-hydroxy-5-sulpho-naphthalene, 1-hydroxy-3,6-disulpho-naphthalene, 1-hydrox-3,7-disulphonaphthalene, 1-hydroxy-3,8-disulpho-naphthalene, 1-hydroxy-4,6-disulpho-naphthalene, 1-hydroxy-4,7-disulpho-naphthalene, 1-hydroxy-4,8-disulpho-naphthalene, 1-hydroxy-3,5-disulphonaphthalene, 1-hydroxy-8-benzoyl-amino-3,6-disulpho-naphthalene, 1-hydroxy-8-benzoyl-amino-3,5-disulpho-naphthalene, 1-hydroxy-8-ureido-3,6-disulpho-naphthalene, 1-hydroxy-8-ureido-3,5-disulpho-naphthalene, 1-hydroxy-8-acetylamino-3,5-disulphonaphthalene, 1-hydroxy-8-acetylamino-3,6-disulpho-naphthalene, 1-hydroxy-7-amino-3-sulpho-naphthalene, 1-hydroxy-7-phenylamino-3-sulpho-naphthalene, 1-hydroxy-8-amino-3,6-disulphonaphthalene, 1-hydroxy-8-amino-3,5-disulpho-naphthalene, 1-hydroxy-7-amino-3,6-disulpho-naphthalene, 1-hydroxy-6-amino-3-sulpho-naphthalene, 1-hydroxy-6-amino amino-3,5-disulphonaphthalene, 4-sulpho-benzene-<1 azo 7>-8-amino-1-hydroxy-3,6-disulpho-naphthalene, 3-sulpho-benzene-<1 azo 7>-8-amino-1-hydroxy-3,5-disulpho-naphthalene, 4-nitro-2-sulpho-benzene-<1 azo 7>-8-amino-1-hydroxy-3,6-disulpho-naphthalene, 1-(2',3'- or 4'-sulpho-phenyl)-3-methyl-pyrazolone-5, 1-(2'-chloro-4'or -5-sulpho-phenyl)-3-methyl-pyrazolone-5, 1-(2'-methyl-4'-sulpho-phenyl)-3-methyl-pyrazolone-5, 1-(2'-methyl-4'-sulphophenyl)-3-carboxy-pyrazolone-5, 1-β-carboxy-ethyl-3-carboxypyrazolone-5, 1-(4',8'-disulpho-naphthyl-(2))-3-methylpyrazolone-5, 1-(5',7'-disulpho-naphthyl-(2))-3-methylpyrazolone-5, 1-(2'-chloro-5'-sulpho-phenyl)-3-methyl-5-aminopyrazole, 1-(2'-chloro-4'-sulpho-phenyl)-3-methyl-5-aminopyrazole, 1-(3'- or 4'-sulpho-phenyl)-3-methyl-5-aminopyrazole, 1-carboxy-methyl-3-methyl-pyrazolone-5, 1-β-carboxyethyl-3-methyl-pyrazolone-5, 1-β-carboxyethyl-3-methyl-5-amino-pyrazole and 1-(4'-sulpho-phenyl)-3-carboxy-pyrazolone-5.

If the monoazo dyestuffs obtainable with the azo components mentioned still contain diazotisable amino groups, these can also be diazotised according to a customary process and again be reacted with a suitable coupling component, whereby disazo dyestuffs are obtained.

The coupling component for the renewed reaction with the diazotised monoazo dyestuff can be, for example, a compound from the series of the azo components (XI) already mentioned.

A further possibility of synthesising disazo dyestuffs of the nature mentioned consists of preparing monoazo dyestuffs which still contain positions capable of coupling and then combining these with suitable diazo components in a second coupling step, it being possible to employ the 2-amino-1-sulpho-5-aminomethyl-naphthalene, which is to be used according to the invention, for the first or for the second coupling step. As azo components which serve to synthesise such monoazo dyestuffs, components from the series of the dihydroxy-benzenes, dihydroxynaphthalenes and aminohydroxynaphthalenes are above all used. In addition to the components already mentioned, 1,3-dihydroxybenzene and 1,3-dihydroxynaphthalene-5,7-disulphonic acid may be mentioned as further examples. As the diazo component for the synthesis of such diazo dyestuffs it is possible to use, amongst others: 1-Amino-4-sulpho-benzene, 1-amino-3-sulpho-benzene, 1-amino-2-chloro-5-sulpho-benzene, 1-amino-2-sulpho-4-nitro-benzene, 1-amino-2,5-disulphobenzene, 1-amino-4-nitro-benzene, 1-amino-4-methyl-sulphonyl-benzene, 2-amino-4,8-disulpho-naphthalene and 2-amino-6,8-disulpho-naphthalene.

According to a further process variant, the new dyestuffs of the general formula (I) can also be manufactured by combining diazotised amines of the general formula

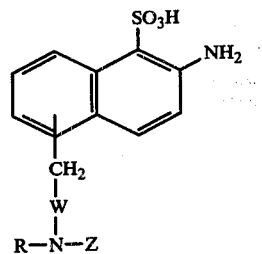

(XII)

wherein
R, W and Z have the indicated meaning
with azo components H—A
wherein
A has the indicated meaning.

The compounds of the formula (III) especially those of the formula (IV), are valuable intermediate products which are suitable, for example, for the manufacture of the dyestuffs (I). The compounds of the probable formula (IV) can be manufactured according to Tscherniak-Einhorn by reaction of 2-amino-1-sulphonaphthalene or 2-acylamino-1-sulphonaphthalene with N-methylolamides, N-methylolimides, alkylethers of N-methylolamides or N-methylolimides, N-halogenomethylamides, N-halogenomethylimides, N,N-methylene-bis-amides, N,N-alkylidene-bis-amides or mixtures of formaldehyde, or formaldehyde derivatives, and amides or nitriles in an acid medium, preferably concentrated sulphuric acid, and subsequent saponification of the 2-amino- or 2-acylamino-1-sulpho-5-acylaminomethyl-naphthalenes thereby produced. The saponification is appropriately effected at temperatures above 100° C in an alkaline medium. Examples of suitable reagents of the abovementioned nature are N-methylolchloroacetamide, N-methylolbenzamide, N-methylolacetamide, N-methylolphthalimide, N-methyl-N-methylolacetamide, N-methylol-4-chlorobenzamide, N-methoxymethylbenzamide, N-chloromethylbenzamide, N-chloromethylphthalimide and N,N'-methylene-bis-chloroacetamide.

The reaction with the electrophilic reagents is carried out in a known manner (compare, for example, Organic Reactions, Volume 14, 1965, published by John Wiley & Sons, New York-London-Sydney, page 124).

Thus, for example, the reaction of 2-acetylamino-1-sulphonaphthalene with N-methylolphthalimide in concentrated sulphuric acid at about 0°-50° C, followed by saponification, yields, in almost 90% yield, a single product which according to examinations by NMR spectroscopy corresponds (in the form of the free acid) to the following formula:

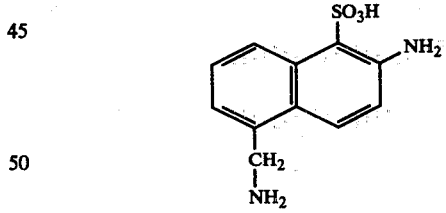

The unambiguous course of the reaction and the high yield, are surprising in view of the fact that in the condensation of methylolamides with 2-acetylaminonaphthalene compounds of unknown substitution result (compare Organic Reactions, Volume 14, 1965, published by John Wiley & Sons, New York-London-Sydney, page 146).

The new dyestuffs are suitable for dyeing and printing materials containing hydroxyl groups or amide groups, such as textile fibres, filaments and fabrics of wool, silk, synthetic polyamide and polyurethane fibres, and for the wash-fast dyeing and printing of natural or regenerated cellulose, the treatment of cellulose materials appropriately being carried out in the presence of acid-binding agents and optionally by using a heat treatment, in accordance with the processes customary for reactive dyestuffs.

In the examples which follow, parts represent parts by weight. The temperatures stated are degrees Centigrade.

EXAMPLE 1

287 Parts (calculated as the Na salt) of 2-acetylamino-1-sulpho-naphthalene are introduced into 1,000 parts by volume of concentrated sulphuric acid at 20° C. Thereafter, 177 parts of finely powdered N-methylolphthalimide are introduced at 15°–20°. The mixture is stirred for 24 hours at room temperature and the clear dark solution is poured out onto 3,000 parts of ice. The precipitate is filtered off and washed on the filter with 1:1 sodium chloride solution to remove the excess sulphuric acid. The paste is stirred up with 3,000 parts of water and is next neutralised with concentrated sodium hydroxide solution. After reaching the neutral point, sufficient concentrated sodium hydroxide solution is further added to give an approx. 2 N sodium hydroxide solution. In order to split off the acetyl group in the 2-position and the phthalyl group in the 5-position, the mixture is warmed to 170° C in an autoclave for 1 hour. After cooling to room temperature, the pH is adjusted to 7. 2-Amino-1-sulpho-5-aminomethyl-naphthalene precipitates as a sparingly soluble internal salt. After drying, 220 parts (87.5%) of a colourless solid substance are obtained.

The analysis shows an atomic ratio of C:N:S = 11:2:1.

The sample, dissolved in $H_2O/NaOH$, shows a 220 MHZ proton resonance spectrum which indicates the following structure:

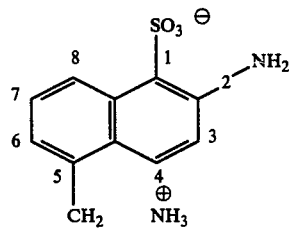

Attribution of protons:
Proton on $C_6$ at $8.44_3$ ppm
on $C_7$ at 7.340 ppm
on $C_4$ at $7.20_4$ ppm
on $C_8$ at $6.87_5$ ppm
on $C_3$ at $6.65_9$ ppm However it should be emphasised that an alternative with $CH_2NH_3$ on $C_8$ cannot be excluded entirely.

Instead of 177 parts of N-methylol-phthalimide it is also possible to employ a corresponding amount of N-methylolbenzamide or N-methylol-chloroacetamide.

EXAMPLE 2

287 Parts of 2-acetylamino-1-sulpho-naphthalene (calculated as the Na salt) are introduced into 1,000 parts by volume of concentrated sulphuric acid, during which the temperature should not rise above 20°–25° C. Thereafter 153 parts of N-methylolbenzamide are introduced and the mixture is stirred for 24 hours at room temperature. The clear solution is poured out onto 3,000 parts of ice and the product is filtered off. The precipitate is washed with sodium chloride solution. The moist paste is stirred with water and neutralised. Sufficient sodium hydroxide solution to give an approx. 2 N sodium hydroxide solution is then added. The mixture is stirred for 1 hour at 80°–90°. Acidification of the cooled solution yields 2-amino-1-sulpho-5-benzoylamino-methyl-naphthalene. The analysis shows an atomic weight ratio of C:H:S = 18:2:1.

Instead of N-methylolbenzamide, N-methylol-(3- or 4-nitro)-benzamide can also be employed. After selective saponification and reduction, 1-sulpho-2-amino-5-(3' or 4'-amino)-benzoylaminomethyl-naphthalene is obtained therefrom.

If N-methylol-chloroacetamide is used and the resulting 2-amino-1-sulpho-5-chloroacetylamino-methyl-naphthalene is treated with excess methylamine at 80°–100°, 2-amino-1-sulpho-5-methylaminoacetylamino-methyl-naphthalene is obtained. The formulae indicated in the examples which follow are the most probable formulae according to the investigations to date.

EXAMPLE 3

36.5 Parts of 2-amino-1-sulpho-5-aminomethylnaphthalene are stirred with 400 parts of ice water and 40 parts by volume of concentrated hydrochloric acid are added. 34 parts by volume of 30% strength sodium nitrite solution are then added dropwise. During the diazotisation, a clear solution is briefly formed. Towards the end of the dropwise addition, the diazotisation product precipitates. 61 parts of 1-hydroxy-8-benzoyl-amino-3,5-disulpho-naphthalene are dissolved in 500 parts by volume of warm water. The solution is cooled by introduction of ice, 40 parts of sodium bicarbonate are added and the suspension is added in portions to the diazotisation mixture. The coupling requires several hours. After completion of coupling, the dyestuff which has precipitated is filtered off and stirred with 1,500 parts by volume of water to prepare it for the acylation. 16 parts by volume of 2,4,6-trifluoro-5-chloro-pyrimidine are added dropwise to the suspension at 15°–20° and pH 8.5. The pH of 8.5 is maintained by simultaneous addition of 2 N sodium hydroxide solution. During the acylation, the dyestuff becomes more easily soluble. The acylation is complete after 125–140 parts by volume of 2 N sodium hydroxide solution have been consumed. The dyestuff is separated out by adding 10% by volume of NaCl. After filtration, drying and grinding a powder which dissolves in water to give a clear red colour is obtained. The resulting dyestuff corresponds to the formula

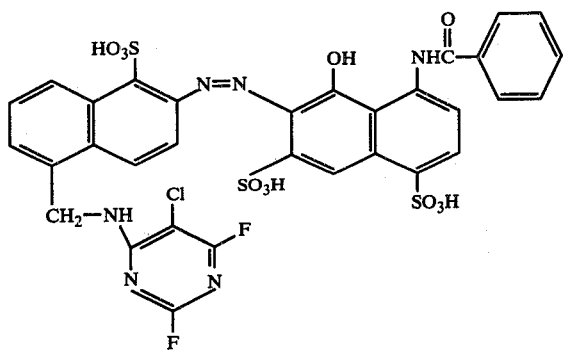

Printing Instruction

Mercerised cotton satin is printed with a printing paste of the following composition:

| | |
|---|---|
| 30 | parts of the dyestuff obtained according to Example 3 |
| 100 | parts of urea |
| 395 | parts of water |
| 450 | parts of a 3% strength sodium alginate thickener |
| 10 | parts of sodium 1-nitrobenzene-3-sulphonate |
| 15 | parts of sodium bicarbonate |
| 1,000 | parts |

The dried textile material is steamed for 10-15 minutes at 102°-104° and is subsequently rinsed cold and warm. After soaping at the boil and subsequently rinsing again and drying, a bluish-tinged red print of very good light fastness and wet fastness properties is obtained.

Padding Instruction

30 Parts of the dyestuff prepared according to Example 3 are dissolved in 1,000 parts of water. A cotton fabric is padded with this solution and squeezed out to a weight decrease of 90%. The cotton, whilst still moist, is treated for 30 minutes at 70° in a bath which contains 300 parts of calcined sodium sulphate and 10 parts of calcined sodium carbonate dissolved in 1,000 parts of water. Thereafter the dyeing is finished in the usual manner. A clear bluish-tinged red dyeing with excellent wet fastness and light fastness properties is obtained.

Dyeing Instruction 168 ml of water at 20°-25° are initially introduced into a dyeing beaker of 300 ml capacity which is in a water bath which can be heated. 0.3 g of the dyestuff obtained according to Example 3 is thoroughly worked into a paste with 2 ml of cold water and 30 ml of hot water (70°) are added; hereupon, the dyestuff dissolves. The dyestuff solution is added to the water initially taken and 10 g of cotton yarn are constantly agitated in this dyeing liquor. The temperature of the dyeing liquor is raised to 70°-80° over the course of 10 minutes, 10 g of anhydrous sodium sulphate are added and dyeing is continued for 30 minutes. 4 g of anhydrous sodium carbonate are then added to the dyeing liquor, and dyeing is carried out for 60 minutes at 70°-80°. The dyed material is then removed from the dyeing liquor, the adhering liquor is removed by wringing out or squeezing out and the material is first rinsed with cold water and then rinsed with hot water until no more bleeding into the rinsing liquor occurs. Thereafter the dyed material is soaped for 20 minutes at the boil in 200 ml of a liquor which contains 0.2 g of sodium alkyl-sulphate, again rinsed and dried in a drying cabinet at 60°-70°. A clear red dyeing of outstanding fastness to washing and to light and good stability to the action of chlorine is obtained.

Further valuable dyestuffs having the colour shades listed in the last column are obtained if the instructions of this example are followed in their general sense but instead of 2,4,6-trifluoro-5-chloro-pyrimidine an equivalent amount of one of the reactive components mentioned in Column 3 is employed and instead of 1-hydroxy-8-benzoyl-amino-3,5-di-sulpho-naphthalene an equivalent amount of one of the azo components listed in Column 2 is employed.

| Example | Azo component | Reactive component | Colour shade |
|---|---|---|---|
| 4 | 1-hydroxy-8-benzoyl-amino-3,5-disulpho-naphthalene | cyanuric chloride | bluish-tinged red |
| 5 | " | 2,4-dichloro-6-amino-triazine | " |
| 6 | " | 2,4-dichloro-6-(4'-sulphophenyl-amino)-triazine | " |
| 7 | " | 4,5-dichloro-2-methylsulphonyl-6-methyl-pyrimidine | " |
| 8 | 1-hydroxy-8-benzoyl-amino-3,6-disulpho-naphthalene | 2,4,6-trifluoro-5-chloro-pyrimidine | " |
| 9 | " | cyanuric chloride | " |
| 10 | 1-hydroxy-8-acetyl-amino-3,5-disulpho-naphthalene | 2,4,6-trifluoro-5-chloro-pyrimidine | " |
| 11 | 1-hydroxy-8-acetyl-amino-3,6-disulpho-naphthalene | " | " |
| 12 | 1-hydroxy-3,6-disulpho-naphthalene | " | yellowish-tinged red |
| 13 | 1-hydroxy-4,6-disulpho-naphthalene | " | " |
| 14 | 1-hydroxy-4,7-disulpho-naphthalene | " | " |
| 15 | 1-hydroxy-3,5-disulpho-naphthalene | " | " |
| 16 | 1-hydroxy-4,6-disulpho-naphthalene | 2,3-dichloroquinoxaline-6-carboxylic | " |

-continued

| Example | Azo component | Reactive component | Colour shade |
|---|---|---|---|
| 17 | " | acid chloride cyanuric chloride | " |
| 18 | 1-hydroxy-4,6-disulpho-naphthalene | tetrachloropyrimidine | yellowish-tinged red |
| 19 | 2-hydroxy-3,6-disulpho-naphthalene | 2,4,6-trifluoro-5-chloro-pyrimidine | red |
| 20 | 2-hydroxy-6-sulpho-naphthalene | " | scarlet |
| 21 | 2-hydroxy-7-sulpho-naphthalene | " | scarlet |

EXAMPLE 22

36.5 Parts of 2-amino-1-sulpho-5-aminomethyl-naphthalene are stirred with 400 parts of ice water and 40 parts by volume of concentrated hydrochloric acid are added. 34 parts by volume of 30% strength sodium nitrite solution are then added dropwise. During the diazotisation, a clear solution is briefly formed. Towards the end of the dropwise addition the diazotisation product precipitates. 42 parts of 1-(2'-chloro-5'-sulphophenyl)-3-methyl-pyrazolone-5 are dissolved in 500 parts by volume of water to give a neutral solution and 40 parts of sodium bicarbonate are added. The diazotisation mixture is added in portions. After completion of coupling, the mixture is warmed to 40°, 40 parts of 2,3-dichloroquinoxaline-6-carboxylic acid chloride are sprinkled in and pH of 7-8 is maintained by dropwise addition of 10% strength sodium carbonate solution. During the acylation, the dyestuff dissolves. When the paper chromatogram indicates the end of the diazotisation, the mixture is clarified and the dyestuff is separated out by salting out. After isolation, drying and grinding, an easily water-soluble yellow dyestuff powder is obtained. In the form of the free acid, the dyestuff corresponds to the following composition:

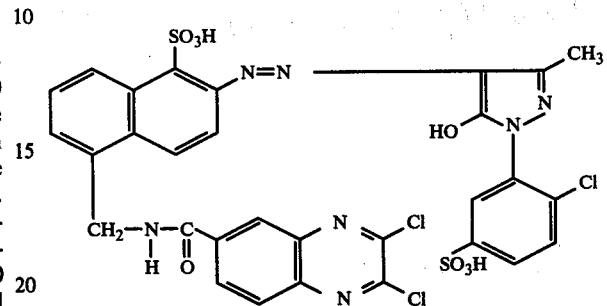

If one of the dyeing instructions described in the appendix to Example 3 is followed, the dyestuff gives, on cotton, a strongly coloured greenish-tinged yellow dyeing having very good wet fastness and light fastness properties.

If the instructions of this example are followed but instead of 2,3-dichloroquinoxaline-6-carboxylic acid chloride the reactive components mentioned in Column 3 are taken and instead of 1-(2'-chloro-5'-sulphophenyl)-3-methylpyrazolone-5 the azo components listed in Column 2 are taken, valuable dyestuffs are again obtained, of which the colour shades on cotton are indicated in the last column.

| Example | Azo component | Reactive component | Colour shade |
|---|---|---|---|
| 23 | 1-(2'-sulphophenyl)-3-methyl-pyrazolone-5 | 2,4,6-trifluoro-5-chloro-pyrimidine | greenish-tinged yellow |
| 24 | " | cyanuric chloride | " |
| 25 | " | tetrachloropyrimidine | " |
| 26 | " | 2,3-dichloroquinoxaline-6-carboxylic acid chloride | " |
| 27 | 1-(2',5'-disulpho-phenyl)-3-methyl-pyrazolone-5 | " | " |
| 28 | " | 2,4,6-trifluoro-5-chloro-pyrimidine | " |
| 29 | " | cyanuric chloride | " |
| 30 | 1-(4',8'-disulpho-naphthyl-(2))-3-methyl-pyrazolone-5 | " | " |
| 31 | " | tetrachloropyrimidine | " |
| 32 | " | 1,4-dichlorophthalazine-6-carboxylic acid chloride | " |
| 33 | " | cyanuric chloride | " |
| 34 | 1-(5',7'-disulpho-naphthyl -(2))-3-methyl-pyrazolone-5 | " | " |
| 35 | " | 3-(4',5'-dichloropyridazon-6'-yl-1')-phenylsulphonic acid chloride | " |
| 36 | " | 2-methylsulphonyl-benzthiazole-5-carboxylic acid chloride | " |
| 37 | 1-(5',7'-disulpho-naphthyl-(2))-3-methyl-pyrazolone-5 | α-bromoacrylic acid chloride | greenish-tinged yellow |
| 38 | 1-(4',8'-disulpho-naphthyl-(2))-3-methyl-5-amino-pyrazole | 2,4,6-trifluoro-5-chloro-pyrimidine | " |
| 39 | " | cyanuric chloride | " |
| 40 | (1-(2'-methyl-4'-sulpho-phenyl)-3-methyl-5-amino-pyrazole | " | " |
| 41 | " | 2,4,6-trifluoro-5-chloro-pyrimidine | " |
| 42 | " | 2-methylsulphonyl-4,5-dichloro-6-methyl-pyrimidine | " |
| 43 | 1-(2'-chloro-4'-sulpho-phenyl)-3-methyl-pyrazolone-5 | " | " |
| 44 | " | cyanuric chloride | " |
| 45 | " | 2,4,6-trifluoro-5-chloro-pyrimidine | " |
| 46 | " | 2,3-dichloroquinoxaline-6-carboxylic acid chloride | " |
| 47 | " | 2,3-dichloroquinoxaline-6-sulphonic acid chloride | " |
| 48 | 1-(2',5'-dichloro-4'-sulpho-phenyl)-3-methyl-pyrazolone-5 | 2,4,6-trifluoro-5-chloro-pyrimidine | " |
| 49 | 1-(2'-methyl-4'-sulpho-6'-chloro- | " | " |

-continued

| Example | Azo component | Reactive component | Colour shade |
|---|---|---|---|
| | phenyl)-3-methyl-pyrazolone-5 | | |
| 50 | 1-(2'-methyl-4'-sulpho-phenyl)-3-carboxy-pyrazolone-5 | 2,4,6-trifluoro-5-chloro-pyrimidine | yellow |
| 51 | " | 2,3-dichloroquinoxaline-6-carboxylic acid chloride | " |
| 52 | " | tetrachloropyrimidine | " |
| 53 | 1-(4'-sulpho-phenyl)-3-carboxy-pyrazolone-5 | 2,4,6-trifluoro-5-chloro-pyrimidine | " |
| 54 | " | tetrachloropyrimidine | " |
| 55 | 1-carboxymethyl-3-methyl-pyrazolone-5 | 2,3-dichloroquinoxaline-6-carboxylic acid chloride | greenish-tinged yellow |
| 56 | " | cyanuric chloride | " |
| 57 | " | 2,4,6-trifluoro-5-chloro-pyrimidine | " |
| 58 | 1-(β-carboxyethyl)-3-methyl-pyrazolone-5 | " | " |
| 59 | " | cyanuric chloride | " |
| 60 | " | 2-methylsulphonyl-4,5-dichloro-6-methyl-pyrimidine | " |
| 61 | " | 2,4,6-trifluoro-5-chloro-pyrimidine | " |
| 62 | 1-(β-carboxyethyl)-3-methyl-5-amino-pyrazole | " | " |
| 63 | 1-(4',8'-disulpho-naphthyl-(2))-3-methyl-5-amino-pyrazole | 2,4,6-trifluoro-5-chloro-pyrimidine yrazole | yellow |
| 64 | 1-(5',7'-disulpho-naphthyl-(2))-3-methyl-5-amino-pyrazole | 2,4,6-trifluoro-5-chloro-pyrimidine | yellow |
| 65 | 1-(4',8'-disulpho-naphthyl-(2))-3-carboxy-pyrazolone-5 | " | golden yellow |
| 66 | 1-(5',7'-disulpho-naphthyl-(2))-3-carboxy-pyrazolone-5 | " | " |
| 67 | " | 2,4-dichloro-pyrimidine-5-carboxylic acid chloride | " |
| 68 | 1-hydroxy-3-sulpho-7-(3'-carboxy-phenylamino)-naphthalene | " | brown |
| 69 | " | 2,4,6-trifluoro-5-chloro-pyrimidine | " |

Dyeing Instruction

10 Parts of woollen piece goods are added at 40° to a dyeing liquor which contains 0.1 part of the dyestuff obtained in Example 41, 0.6 part of acetic acid (30 percent strength by weight), 0.5 part of anhydrous sodium sulphate and 0.2 part of a surface-active auxiliary in 500 parts of water, and the liquor is heated to 70° over the course of 20 minutes. During this time, and up to completion of the dyeing process, the material being dyed is agitated by means of glass rods. After a dwell time of 30 minutes at 70°, the temperature of the dye bath is brought to the boil over the course of 30 minutes and kept thereat for 60 minutes. The dyed material is subsequently withdrawn from the dyeing liquor, rinsed with warm and then with cold water and subsequently dried at 60°–70°. A clear greenish-tinged yellow shade is obtained, which is distinguished by good light fastness and wet fastness properties.

EXAMPLE 70

The diazotisation mixture obtained from 36.5 parts of 2-amino-1-sulpho-5-aminomethyl-naphthalene according to the instructions of Example 3 is treated with a neutral solution of 34.5 parts of 2-amino-8-hydroxy-6-sulphonaphthalene in 300 parts by volume of water. The mixture is stirred, in the acid range, until coupling is complete. The dyestuff is isolated and again whipped up in 2,000 parts by volume of water. 16 parts by volume of 2,4,6-trifluoro-5-chloro-pyrimidine are then added dropwise at 15° and pH 8.5. The pH is kept at between 8.5 and 8.7 by adding 2 N sodium hydroxide solution. When approx. 140 parts by volume of 2 N sodium hydroxide solution have been consumed, the acylation is complete. The dyestuff is salted out. After drying at 50°–60° and grinding, a red dyestuff powder is obtained. The dyestuff corresponds to the following structure:

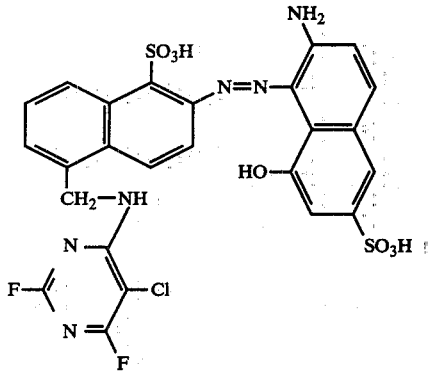

If the dyestuff is used for dyeing wool according to the process mentioned for Example 41, red shades of good light fastness and wet fastness are obtained.

EXAMPLE 71

25 Parts of p-sulphanilic acid are stirred up in 500 parts of ice water, and 30 parts by volume of concentrated hydrochloric acid are added, followed by 34 parts by volume of 30% strength sodium nitrite solution. After completion of the diazotisation, the excess nitrite is destroyed with amidosulphonic acid and a neutral solution of 46 parts of 1-amino-8-hydroxy-3,6-disulphonaphthalene is added dropwise to the diazotisation mixture. The coupling is completed by stirring for several hours. Thereafter suffficient sodium hydroxide solution is added to produce a neutral solution of the dyestuff, and 40 parts of sodium bicarbonate are then added. This solution is mixed with the diazotisation product obtained from 36.5 parts of 2-amino-1-sulpho-5-aminomethyl-naphthalene according to the instructions of Example 3. After completion of coupling, the dyestuff is salted out and isolated. The paste is stirred up in 1,000 parts by volume of water. 16 parts by volume of 2,4,6-trifluoro-5-chloropyrimidine are run in at 15° and pH 8.5. The pH is kept at between 8.5 and 8.7 by simultaneous addition of 2 N sodium hydroxide solution. When a paper chromatogram has shown that the acylation has ended, the dyestuff is salted out. After filtration, drying at 50°-60° and grinding, an easily water-soluble black dyestuff powder is obtained. In the form of the free acid, the dyestuff corresponds to the structure:

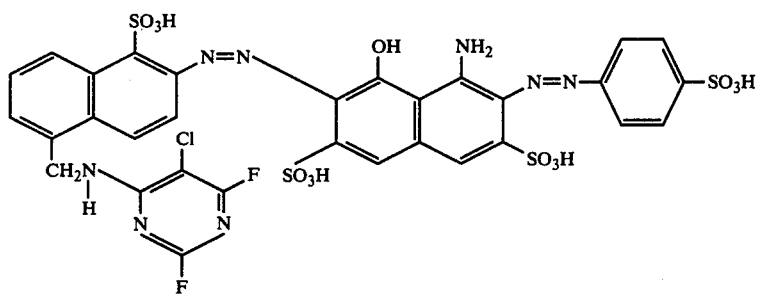

Using one of the dyeing processes mentioned in the appendix to Example 3, the dyestuff gives dyeings and prints of good wet fastness on material containing hydroxyl groups, the dyeings and prints being navy blue to black depending on the amount of the dyestuff employed.

If the general sense of the instructions of this example are followed, using the diazo components for the first coupling, azo components and reactive components listed in the table, valuable dyestuffs are again obtained, which dye cotton, according to one of the processes described, in navy blue to black shades.

phonaphthalene. To accelerate the coupling, the mixture is buffered to pH 2 by adding sodium acetate solution. The acid coupling is complete after stirring for several hours. The dyestuff solution is neutralised with sodium hydroxide solution. 40 parts of sodium bicarbonate and a little CaO are added and the diazotisation product obtained from 25 parts of o-sulphanilic acid is then added. The disazo dyestuff is separated out by adding salt. The paste is stirred into 1,000 parts by volume of water. 16 parts by volume of 2,4,6-trifluoro-5-chloro-pyrimidine are added dropwise at 15° and pH 8.5. The pH is kept at 8.5 by simultaneous addition of 2 N sodium hydroxide solution. After completion of the acylation, the dyestuff is salted out, dried and ground. An easily water-soluble black dyestuff powder is obtained. In the form of the free acid, the dyestuff corresponds to the structure:

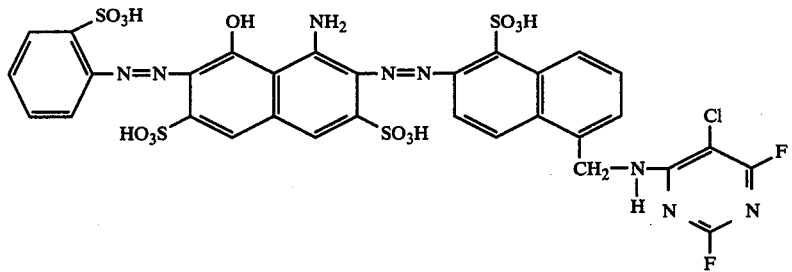

Using one of the dyeing processes mentioned in the appendix to Example 3, the dyestuff gives dyeings and prints of good wet fastness on material containing hydroxyl groups, the dyeings and prints being navy blue to

| Example | Diazo component for the first coupling | Azo component | Reactive component |
|---|---|---|---|
| 72 | p-sulphanilic acid | 1-hydroxy-8-amino-3,6-disulpho-naphthalene | 2,3-dichloroquinoxaline-6-carboxylic acid chloride |
| 73 | " | " | 2,2,3,3-tetrafluorocyclobutyl-carboxylic acid chloride |
| 74 | " | " | cyanuric chloride |
| 75 | m-sulphanilic acid | " | " |
| 76 | " | " | 2,4,6-trifluoro-5-chloro-pyrimidine |
| 77 | " | " | 2,4-dichloro-6-amino-triazine |
| 78 | 2-amino-6,8-disulphonaphthalene | " | cyanuric chloride |
| 79 | " | " | 2,3-dichloroquinoxaline-6-carboxylic acid chloride |
| 80 | 4-sulpho-2-chloro-1-amino-benzene | " | 2,4,6-trifluoro-5-chloro-pyrimidine |
| 81 | " | 1-hydroxy-8-amino-3,5-di-sulpho-benzene | " |

EXAMPLE 82

The diazotisation product prepared according to the instructions of Example 3 from 36.5 parts of 2-amino-1-sulpho-5-aminomethyl-naphthalene is mixed with a neutral solution of 46 parts of 1-hydroxy-8-amino-3,6-disulblack depending on the amount of the dyestuff employed.

If the instructions of this example are followed, using the diazo components for the second coupling, azo components and reactive components listed in the table, valuable dyestuffs are again obtained, which dye cotton according to one of the processes described, in navy blue to black shades.

| Example | Diazo component for the second coupling | Azo component | Reactive component |
|---|---|---|---|
| 83 | m-sulphanilic acid | 1-hydroxy-8-amino-3,6-disulpho-naphthalene | 2,4,6-trifluoro-5-chloro-pyrimidine |
| 84 | p-sulphanilic acid | " | " |
| 85 | aniline | " | " |
| 86 | 1-amino-2,5-disulphobenzene | " | " |
| 87 | " | " | 2,3-dichloroquinoxaline-6-carboxylic acid chloride |
| 88 | " | " | 2,4-dichloro-pyrimidine-3-carboxylic acid chloride |
| 89 | " | 1-hydroxy-8-amino-3,5-disulpho-naphthalene | " |

EXAMPLE 90

223 Parts of 2-amino-1-sulpho-naphthalene are introduced into 1,000 parts by volume of concentrated sulphuric acid at 15°–20°. Thereafter 153 parts of N-methylolbenzamide are added and the mixture is stirred for 24 hours at room temperature. The solution is poured out onto 3,000 parts of ice. The precipitate is filtered off and washed with water. The moist paste is stirred up with 1,500 parts of water, neutralised and after addition of 250 parts by volume of concentrated sodium hydroxide solution (d = 1,48) the mixture is warmed to 170° in an autoclave for 2 hours. After cooling the clear solution obtained is adjusted to pH 7 by addition of concentrated hydrochloric acid whereby the 2-amino-1-sulpho-5-aminomethyl-naphthalene precipitates in form of the betaine. The precipitate is filtered off. The amine content of the moist paste is found out by determination of the nitrite value.

I claim:

1. Azo reactive dyestuff which in the acid form corresponds to the formula

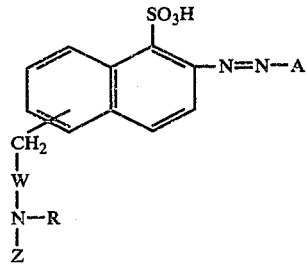

wherein
Z is a fiber-reactive group capable of reacting under dyeing or printing conditions with hydroxy or amino to form a covalent bond;
A is the radical of a coupling component;
W is a direct bond,

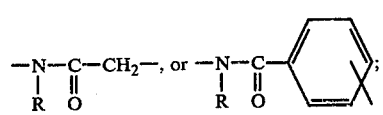

and
R is hydrogen or lower alkyl.

2. Azo reactive dyestuff of claim 1 which in the acid form corresponds to the formula

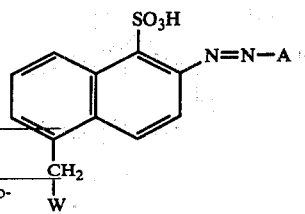

wherein
A, R, W and Z have the meaning indicated in claim 1.

3. Azo reactive dyestuff of claim 1 which in the acid form corresponds to the formula

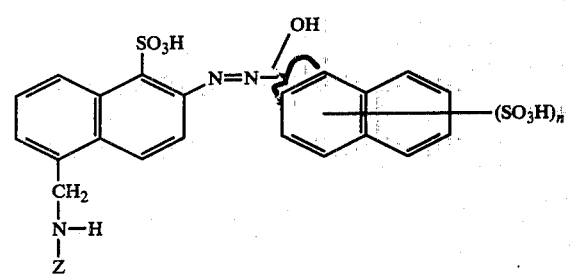

wherein
Z has the meaning indicated in claim 1 and
n represents 1, 2 or 3.

4. Azo reactive dyestuff of claim 1 which in the acid form corresponds to the formula

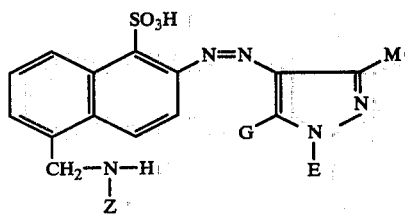

wherein
Z has the meaning indicated in claim 1,
E represents an alkyl, phenyl or naphthyl radical which is substituted by at least one sulphonic acid,
M represents methyl, carboxyl or carbonamide and
G represents OH or $NH_2$.

5. Azo reactive dyestuff of claim 1 which in the acid form corresponds to the formula

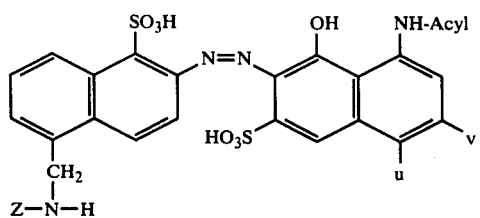

$u$ and $v$ are hydrogen or sulphonic acid, and acyl is ($C_1$–$C_4$-alkyl)carbonyl, ($C_1$–$C_4$-alkyl) sulphonyl, phenylcarbonyl, phenylsulphonyl, or either of the last two mentioned radicals wherein the phenyl portion is substituted by chloro, $C_1$–$C_4$-alkyl, or $C_1$–$C_4$-alkoxy.

6. Azo reactive dyestuff of claim 1 which in the acid form corresponds to the formula

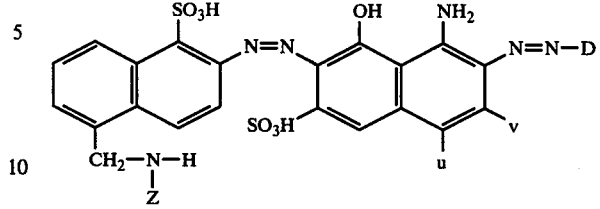

wherein
 $u$ and $v$ are hydrogen or sulpho; and
 D is the radical of a diazo component of the benzene series or naphthalene series.

* * * * *